United States Patent
Redko et al.

(10) Patent No.: US 10,956,270 B2
(45) Date of Patent: Mar. 23, 2021

(54) SYSTEM AND METHOD FOR DATA PROTECTION DURING FULL DATA BACKUP

(71) Applicant: Acronis International GmbH, Schaffhausen (CH)

(72) Inventors: Andrey Redko, Moscow (RU); Stanislav Protasov, Moscow (RU); Serguei Beloussov, Singapore (SG); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 942 days.

(21) Appl. No.: 15/084,815

(22) Filed: Mar. 30, 2016

(65) Prior Publication Data

US 2017/0286228 A1    Oct. 5, 2017

(51) Int. Cl.
  *G06F 11/14*    (2006.01)
  *G06F 11/30*    (2006.01)
  *G06F 16/11*    (2019.01)

(52) U.S. Cl.
  CPC ...... *G06F 11/1446* (2013.01); *G06F 11/3003* (2013.01); *G06F 16/128* (2019.01)

(58) Field of Classification Search
  CPC . G06F 11/1446; G06F 16/128; G06F 11/3003
  See application file for complete search history.

(56) References Cited

U.S. PATENT DOCUMENTS

| | | | | |
|---|---|---|---|---|
| 5,835,953 A * | 11/1998 | Ohran | ................ | G06F 11/1451 711/162 |
| 7,047,380 B2 * | 5/2006 | Tormasov | ........... | G06F 11/1451 711/162 |
| 7,246,211 B1 * | 7/2007 | Beloussov | .......... | G06F 11/1461 707/999.2 |
| 7,296,125 B2 * | 11/2007 | Ohran | ................ | G06F 11/1451 707/999.202 |
| 7,734,591 B1 * | 6/2010 | Mercier | ............. | G06F 11/1466 707/639 |
| 8,161,254 B2 * | 4/2012 | Liu | ..................... | G06F 11/1451 711/162 |
| 8,250,033 B1 * | 8/2012 | De Souter | ......... | G06F 17/30088 707/637 |
| 8,326,803 B1 * | 12/2012 | Stringham | ............ | G06F 3/0619 707/652 |
| 8,572,337 B1 * | 10/2013 | Gokhale | ............. | G06F 11/1466 711/162 |
| 9,015,430 B2 * | 4/2015 | Ranade | ................ | G06F 16/128 711/162 |
| 9,535,907 B1 * | 1/2017 | Stringham | .......... | G06F 11/1435 |

(Continued)

*Primary Examiner* — Mohsen Almani
(74) *Attorney, Agent, or Firm* — Arent Fox LLP; Michael Fainberg (57) ABSTRACT

A system and method is provided for performing a full data backup of user data with data protection. An example method includes generating a snapshot of the electronic data stored in memory, initiating a transfer of the electronic data to a data storage facility; detecting requests to modify a file of the electronic data, saving an initial version of the file based on the snapshot of the electronic data, continuing the transfer of the data to the data storage facility, and transferring the modified file using the initial version of the file based on the snapshot of the electronic data.

20 Claims, 8 Drawing Sheets

(56) References Cited

U.S. PATENT DOCUMENTS

| | | | |
|---|---|---|---|
| 9,946,608 B1* | 4/2018 | Per | G06F 3/064 |
| 2004/0220971 A1* | 11/2004 | Kaushik | G06F 11/1464 |
| 2006/0106893 A1* | 5/2006 | Daniels | G06F 11/1435 |
| 2007/0027936 A1* | 2/2007 | Stakutis | G06F 11/1451 |
| 2008/0010422 A1* | 1/2008 | Suzuki | G06F 11/1471 711/162 |
| 2009/0300305 A1* | 12/2009 | Liu | G06F 11/1466 711/162 |
| 2010/0011178 A1* | 1/2010 | Feathergill | G06F 11/1466 711/162 |
| 2011/0161295 A1* | 6/2011 | Ngo | G06F 11/1471 707/639 |
| 2012/0136827 A1* | 5/2012 | Wang | H04L 67/1095 707/623 |
| 2013/0007389 A1* | 1/2013 | Patterson | G06F 3/065 711/162 |
| 2014/0214766 A1* | 7/2014 | Kato | G06F 11/1451 707/640 |
| 2015/0012494 A1* | 1/2015 | Jewell | G06F 11/1456 707/638 |
| 2015/0067390 A1* | 3/2015 | Blake | G06F 9/45558 714/15 |
| 2015/0186044 A1* | 7/2015 | Sharma | G06F 3/065 711/162 |
| 2015/0331758 A1* | 11/2015 | Durge | H04L 29/08 707/640 |
| 2016/0034481 A1* | 2/2016 | Kumarasamy | G06F 11/16 707/639 |
| 2016/0139996 A1* | 5/2016 | Mathew | G06F 16/128 707/646 |
| 2017/0060699 A1* | 3/2017 | Hohl | G06F 16/27 |
| 2017/0083412 A1* | 3/2017 | Mamluk | G06F 11/1456 |
| 2017/0293531 A1* | 10/2017 | Watkins | G06F 11/1451 |
| 2019/0005056 A1* | 1/2019 | Redko | G06F 16/128 |

* cited by examiner

SYSTEM AND METHOD FOR DATA PROTECTION DURING FULL DATA BACKUP

FIELD OF TECHNOLOGY

The present disclosure generally relates to the field of electronic data backup, and, more particularly, to a system and method for performing a full data backup of user data with data protection.

BACKGROUND

Continuing advances in storage technology provide significant amounts of digital data to be stored cheaply and efficiently. However, this means that significant amounts of data can be lost in the event of a failure or catastrophe. Accordingly, data backup of original data is a critical component of computer-based systems. The original data typically resides on a hard drive, or on an array of hard drives, but may also reside on other forms of storage media, such as solid state memory. Data backups are critical for several reasons, including disaster recovery, restoring data lost due to storage media failure, recovering accidentally deleted data, and repairing corrupted data resulting from malfunctioning or malicious software.

Typically, it can take a significant amount of time, from several hours to several days, for data backup systems to perform an initial "full backup" to storage using a cloud service, also known as "seeding". This is because the amount of information can generally be hundreds of gigabytes to several terabytes. Given this amount of data, limited throughput capacity of the network channel (including, sometimes wireless channels) cannot provide quick backup involving the transfer of data to the cloud services. Moreover, while the data is being transferred and until all of the data has been copied to the cloud service, the data is not protected (or secured). As a result, the data can often be damaged by viruses, can be inadvertently modified or deleted by the user, can be lost due to software or hardware failure or the like.

Figure 1:
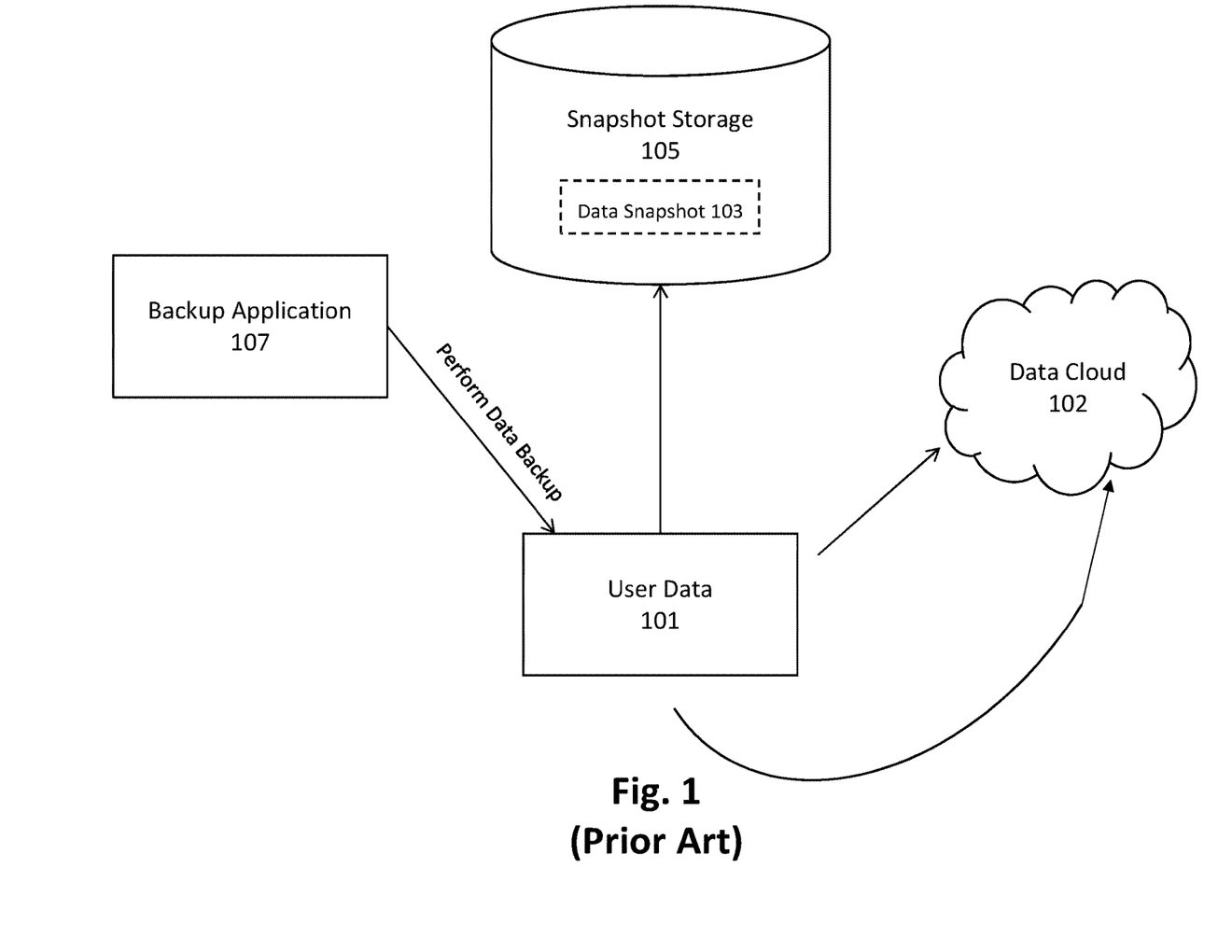
FIG. 1 illustrates a block diagram of a conventional system for performing a full data backup of user data.

FIG. 1 illustrates a block diagram of a conventional system for performing a full data backup of user data. As shown, the system includes user data 101 (e.g., a hard drive, data server, or the like), a data cloud 102, snapshot storage 105 and a backup application 107. The backup application can be a software application that performs a data backup of user data 101 onto storage of the data cloud 102 as described above. In order to perform the initial data backup of user data 101, the backup application 107 typically starts copying the user data 101 to the cloud storage 102 as shown. However, before data is actually transferred, the backup application 107 will create a data snapshot 103 of the user data 101, with the data snapshot 103 being stored in separate storage, such as snapshot storage 105. In this regard, the data snapshot 103 is provided to store/save the state of the user data 101 that may be changed during the backup. In other words, if there is a system call to write data (e.g., change data, delete data or the like), the data snapshot 103 preserves the original version of the user data 101, which was the version taken at the time the snapshot was created.

The system illustrated in FIG. 1 suffers from significant limitations. For example, if the user data 101 has been damaged accidentally, inadvertently or as a result of a failure, the snapshot generally cannot not save the data. As such, there is very real risk of data loss. Moreover, the data snapshot 103 itself may be damaged before the end of the backup process of the user data 101. As such, the data snapshot 103 is generally not a reliable method of storing data since it generally serves the purpose of fixating the state of the data at a particular time, but not actually serving as a full backup of the user data 101.

SUMMARY

In view of the limitations of conventional data backup systems, a system and method is disclosed herein for performing a full data backup of user data with data protection. According to an exemplar aspect, the method includes generating, by a processor, a snapshot of the electronic data stored in at least one electronic memory; initiating, by a processor, a transfer of the electronic data stored in the at least one electronic memory to a data storage facility; detecting, by the processor, at least one request to modify a file of the electronic data; saving, in the at least one electronic memory, an initial version of the file based on the snapshot of the electronic data; continuing, by the processor, the transfer of the electronic data stored in the at least one electronic memory to the data storage facility; and transferring, by the processor, the modified file using the initial version of the file based on the snapshot of the electronic data.

According to another exemplary aspect, the method includes saving of the initial version of the file by reading the initial version from the snapshot of the electronic data and saving the initial version of the file in temporary storage.

According to another exemplary aspect, the method includes the transfer of the electronic data to the data storage facility by storing the electronic data as backup data in a cloud storage service.

According to another exemplary aspect, the method includes continuously monitoring, by the processor, the electronic data stored in the at least one electronic memory to detect any additional requests to modify additional files of the electronic data while the electronic data is transferred to the data storage facility.

According to another exemplary aspect, the method includes detecting, by the processor, at least one additional request to modify another file of the electronic data; tracking, by the processor, an intermediate version of the another file; and saving the intermediate version of the another file in the at least one electronic memory.

According to one exemplary aspect, a system is disclosed for generating a backup of electronic data. In this aspect, the system includes a remote data storage facility; at least one local electronic memory configured to store electronic data; and a processor communicatively coupled to the at least one local electronic memory. Moreover, the processor is configured to generate a snapshot of the electronic data stored in the at least one electronic memory, initiate a transfer of the electronic data stored in the at least one electronic memory to the remote a data storage facility, detect at least one request to modify a file of the electronic data; save, in the at least one electronic memory, an initial version of the file based on the snapshot of the electronic data; continue the transfer of the electronic data stored in the at least one electronic memory to the data storage facility, and transfer the modified file using the initial version of the file based on the snapshot of the electronic data.

According to another aspect, a non-transitory computer readable medium storing computer executable instructions is disclosed for generating a backup of electronic data. In this aspect, instructions are provided for generating a snapshot of the electronic data stored in at least one electronic memory; initiating a transfer of the electronic data stored in the at least one electronic memory to a data storage facility; detecting at least one request to modify a file of the electronic data; saving, in the at least one electronic memory, an initial version of the file based on the snapshot of the electronic data; continuing the transfer of the electronic data stored in the at least one electronic memory to the data storage facility; and transferring the modified file using the initial version of the file based on the snapshot of the electronic data.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4A through 4C illustrates a flowchart for a method for performing a full data backup of user data according to an exemplary aspect.

DETAILED DESCRIPTION

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Figure 2:
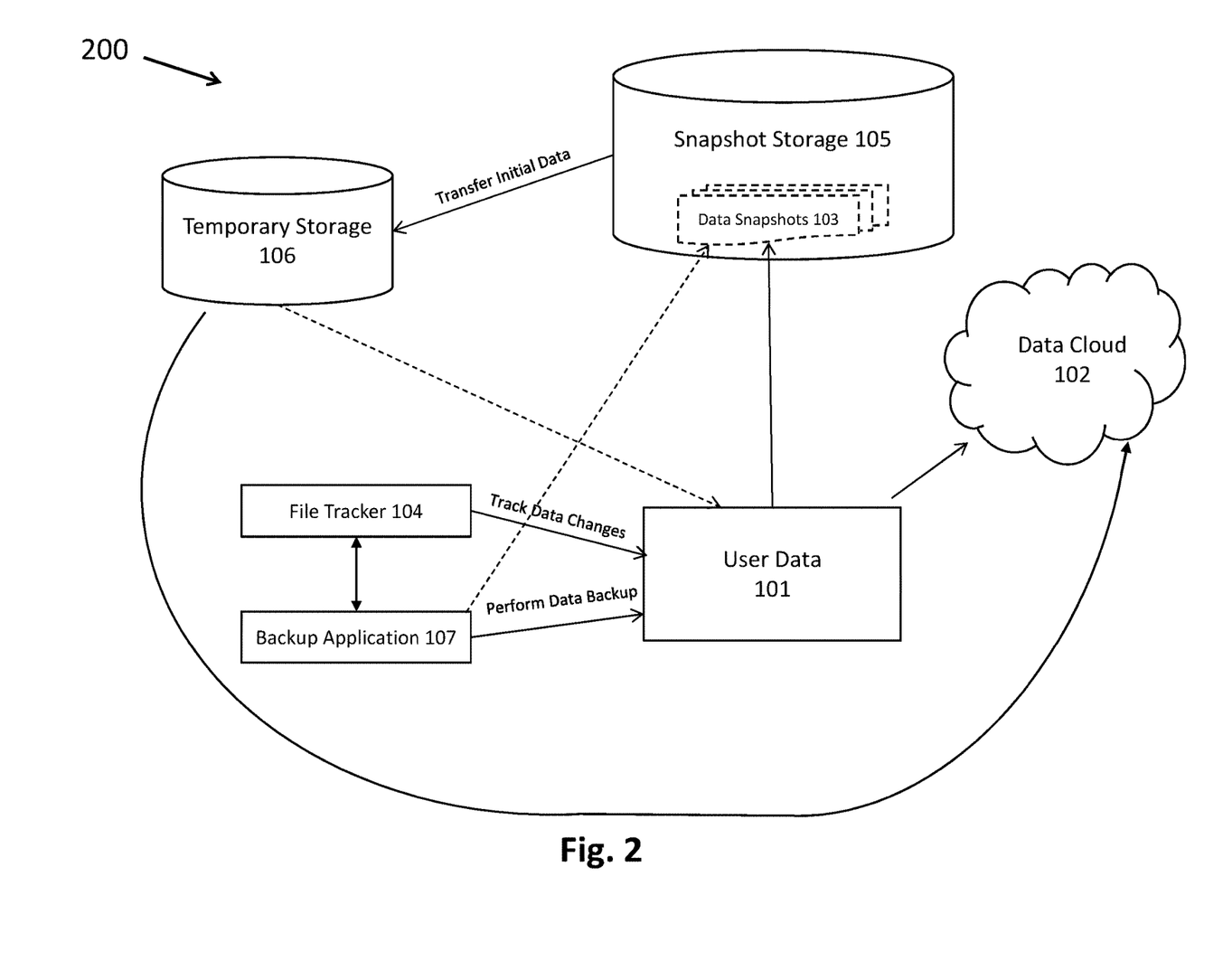
FIG. 2 is a block diagram illustrating a system for performing a full data backup of user data according to an exemplary aspect.

FIG. 2 is a block diagram illustrating a system (or environment) for performing a full data backup according to an exemplary aspect. In general, the system 300 provides data backup services to one or more locale client devices, hosting user data 101, over a network through one or more servers. As shown, the system 200 includes user data 101 that can be any type of digital data of an individual or an entity, such as a company, enterprise or the like. The user data 101 can be stored on any type of storage device, such has a hard disk that is capable of reading and writing of data, although it is generally contemplated that the user data 101 can be stored on a computer information media that is able to store data in a form readable by a computer (e.g., solid state drives, flash memory cards, digital disks, random-access memory (RAM) and so on).

In addition, the data backup system 200 includes one or more additional storage devices for storing snapshot data and temporary data files according to the exemplary aspect. More particularly, as shown in the exemplary aspect, system 200 includes snapshot storage 105 and temporary storage 106. These storage devices 105 and 106 can be any type of computer information media that is configured to store data, including additional hard disks, solid state drives, flash memory cards, digital disks, random-access memory (RAM) and the like. It should also be appreciated that while system 200 illustrates snapshot storage 105 and temporary storage 106 as two separate storage devices, in an alternative embodiment, these storage devices can be implemented as a single storage system or device.

The data backup system 200 also includes one or a plurality of software applications configured to create and manage the data backup process. Specifically, the data backup system 100 includes backup application 107 that is provided to control all actions for creating the data backup of user data 101, the details of which will be discussed below. Furthermore, the data backup system 200 also includes a file tracker application 104 that is a software process or application specifically configured to monitor any request to change, delete or otherwise manipulate the data files of the user data 101. For example, according to one aspect, the file system implemented for data storage can be a New Technology File System ("NTFS") developed by Microsoft®. Moreover, in order to monitor any attempts to change the initial user data 101, the system can implement the USN Journal (i.e., "Update Sequence Number Journal" or "Change Journal") that is an aspect of NTFS provided to maintain a record of changes made to data, as is known to those skilled in the art.

As further shown in FIG. 2 and as will be discussed in more detail below, the backup application is configured to create one or more data snapshots 103 of user data 101. According to the exemplary aspect, these data snapshots can be stored in snapshot storage 105. In addition, temporary storage 106 is provided to store initial data that can be transferred from snapshot storage 105 by backup application 107.

Furthermore, the data backup system 200 includes a data cloud 102 (i.e., remote cloud storage provided by a cloud service) that is provided to store the actual backup copies of the user data 101. Generally, examples of such cloud computing services that may be utilized to store user data include Amazon® Simple Storage Service ("S3"), and Microsoft® Azure ("Azure"). More particularly, companies such as Microsoft® and Amazon® set up networks and infrastructure to provide one or more multi-client services (such as various types of cloud-based storage) that are accessible via the Internet and/or other networks to a distributed set of clients in a company, organization or the like. The infrastructure provided for multi-client services is designed to implement application and/or data virtualization such that different client devices are provided isolated views of the services (i.e., the data files and the like), so that one client accessing the service or service functionality will not be aware that the same set of resources is also being accessed by another client. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

Thus, according to the exemplary aspect, the backup copy or copies of the user data 101 can be stored on one or more data centers of data cloud 102. Moreover, it should be appreciated that while data cloud 102 is described as forming an online/remote file storage service (e.g., a cloud computing service), these components for storage of the backup of user data 101 can be incorporated into a local area network according to an alternative aspect.

Furthermore, although not specifically shown, it should be appreciated that some or all of these components of system 200 described above can communicate with one another by a data network as would be understood to one skilled in the art. For example, a network implemented as part of system 200 can be any network for communicating data and data operations and can include a communication system (not shown) that connects the various computers/components of the system by wire, cable, fiber optic, and/or wireless links facilitated by various types of well-known network elements, such as hubs, switches, routers, and the like. The data network may employ various well-known protocols to communicate information amongst the network resources. In one aspect, the data network can be part of the Internet or intranet using various communications infrastructure such as Ethernet, WiFi and the like.

Figure 3:
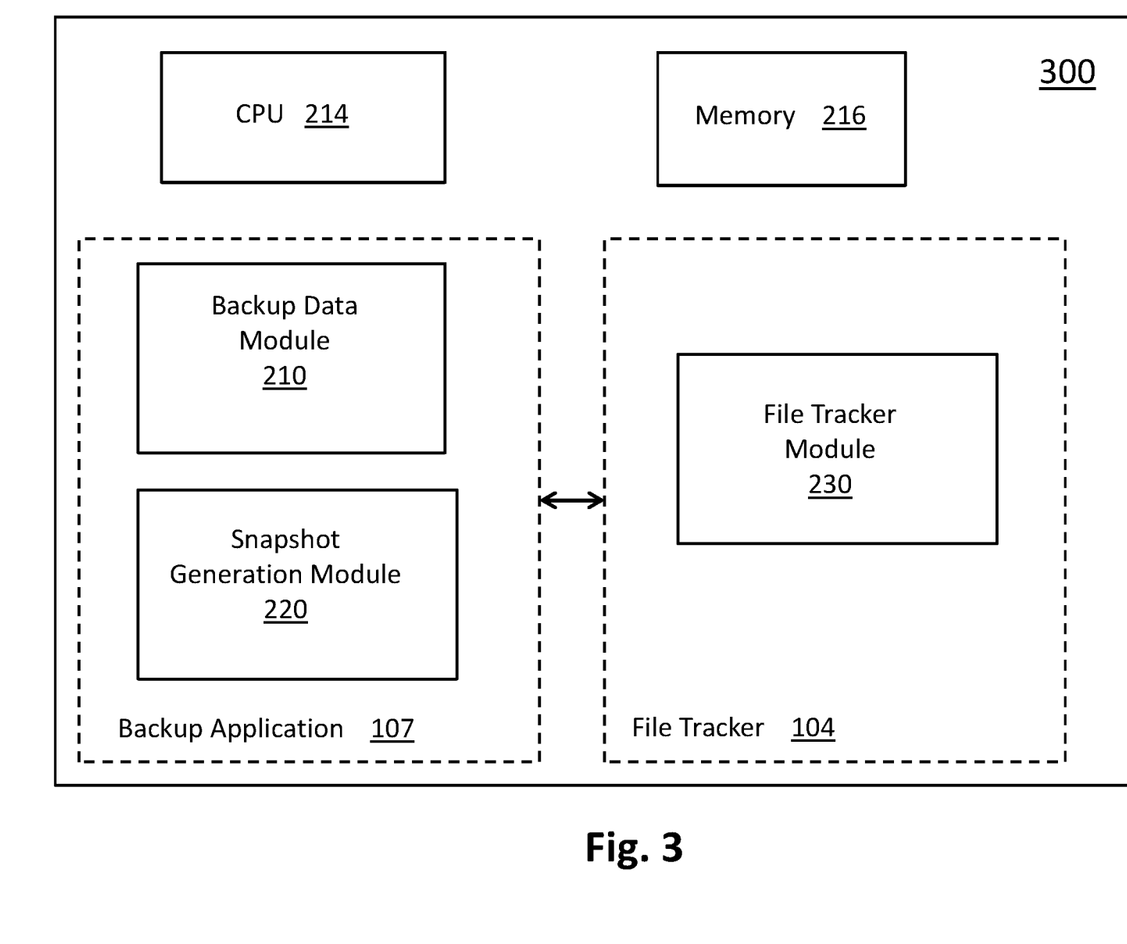
FIG. 3 illustrates a block diagram of a computer configured to perform a full data backup of user data according to an exemplary aspect.

FIG. 3 illustrates a block diagram of a computer 300 configured to implement the application for performing a full data backup of user data 101 according to an exemplary aspect. The specific hardware details of computer 300 will be described below with respect to FIG. 6. However, FIG. 3 illustrates the primary components of an example computer that is configured to read instructions from a machine-readable medium and execute them in a processor (or controller). Specifically, FIG. 3 illustrates a diagrammatic representation of a machine in the example form of a computer system within which instructions (e.g., software or program code) for causing the machine to perform any one or more of the methodologies discussed herein, e.g., with FIGS. 4A through 4C, may be executed. In alternative aspects, the computer operates as a standalone device or may be connected (e.g., networked) to other machines. In a networked deployment, the computer may operate in the capacity of a server machine or a client machine in a server-client network environment, or as a peer machine in a peer-to-peer (or distributed) network environment.

As shown, the backup application 107 and file tracker 104 can be implemented on the computer system 300 using computer-processing unit ("CPU") 214 and memory 216. Moreover, the backup application 107 and file tracker 104 are provided with a number of modules provided as a software applications configured to facilitate the management of data backup of the user data, as described above with respect to FIG. 2.

According to the exemplary aspect, the backup application 107 includes backup data module 210 and snapshot generation module 220. Moreover, file tracker 104 includes file tracker module 230. Each of the modules are configured to perform the algorithms described herein for generating a backup of user data 101 according to the exemplary aspect. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to an exemplary aspect, backup data module 210 is configured to initiate and control the data backup process of user data 101. Specifically, the backup data module 210 is configured to generate instructions to user data 101 to upload files of user data representing backup data to cloud storage 102. In addition, backup data module 210 is also configured to similarly control the transfer of data from temporary storage 106 to cloud storage 102, as will be described in more detail with respect to the algorithms illustrated in FIGS. 4A through 4C.

Moreover, the backup application further includes snapshot generation module 220. After the data backup process is initiated, snapshot generation module 220 is configured to generate a snapshot of the user data 101 that can be saved as data snapshot 103 in snapshot storage 105. In should be appreciated that snapshot generation module 220 also includes necessary configurations to generate a data snapshot. For example, snapshot generation module 220 is configured to collect metadata from the user data 101 that is used to generate the snapshot. Moreover, according to one exemplary aspect, the snapshot generation module 220 locks the operating system of the computer(s) hosting the user data 101 via executable scripts or the like. Once locked, the snapshot generation module 220 is further configured to transmit a command to the operating system to generate the snapshot of the user data. Once a snapshot is generated, the backup data module 210 and/or the snapshot generation module 220 is configured to store the snapshot as a data snapshot 103 in snapshot storage 105.

Furthermore, as shown in FIG. 3, computer 300 includes file tracker 104 that is implemented as a separate application according to the exemplary aspect, but could be implemented as a single application in conjunction with backup application 107 according to an alternative aspect. As shown, the file tracker 104 includes file tracker module 230 that is configured to monitor and detect any changes of user data 101. For example, file tracker module 230 is configured to scan the files of user data 101 according to an exemplary aspect and detect any I/O requests to change, delete or otherwise manipulate the user date. Moreover, file tracker module 230 is configured to transmit a notification to backup application 107 of any data changes, which can be processed as described below.

Figure 4A:
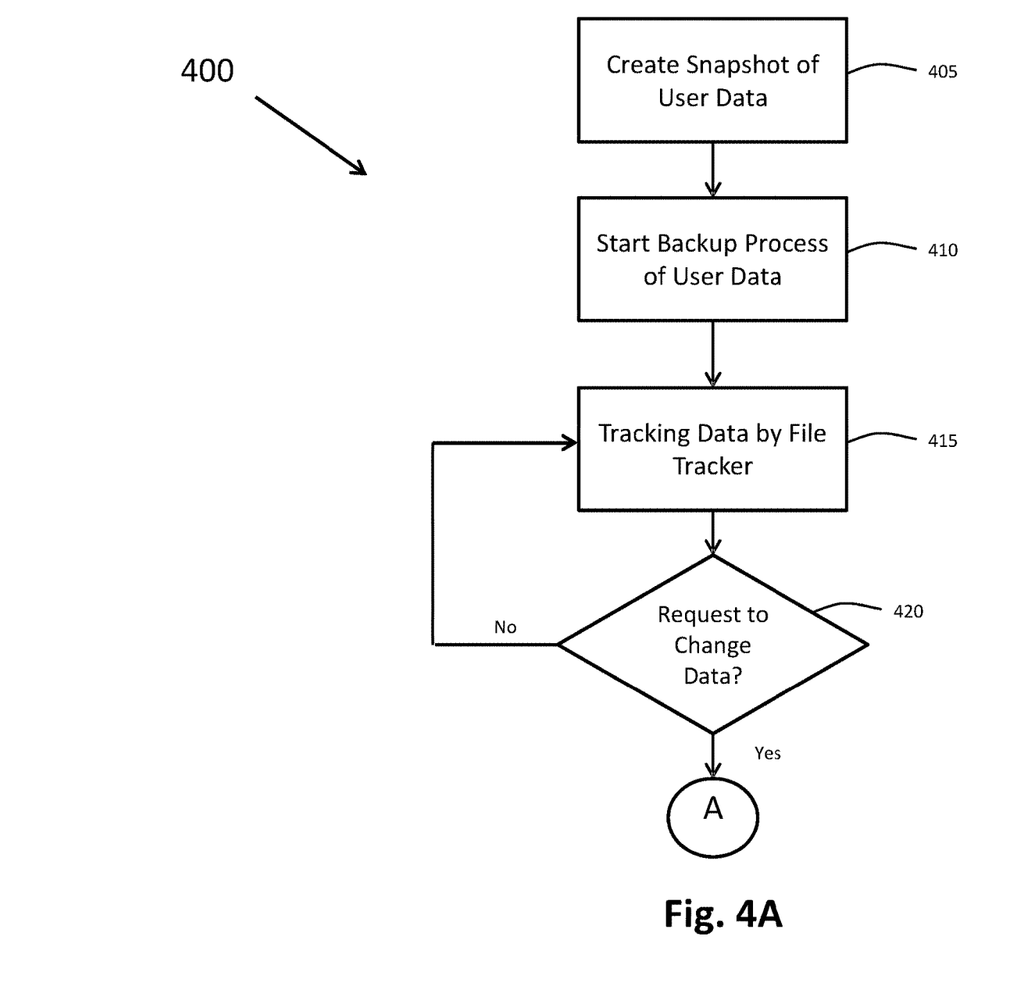
Figure 4B:
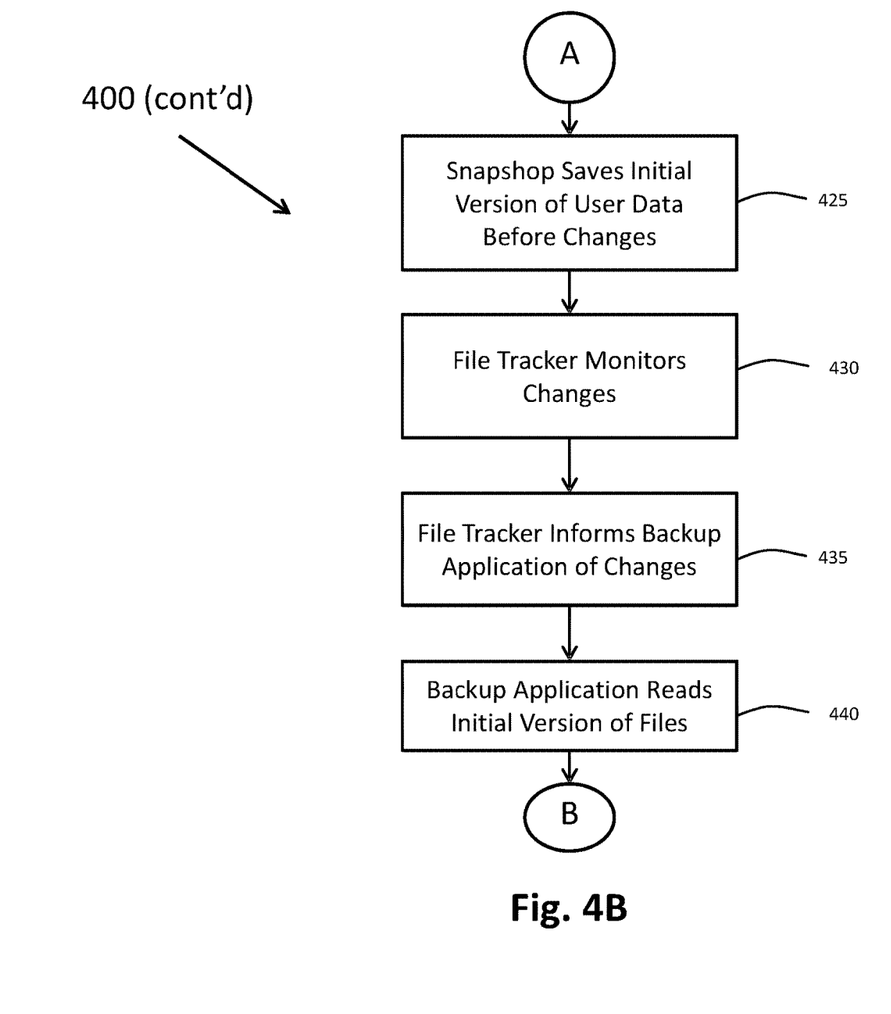
Figure 4C:
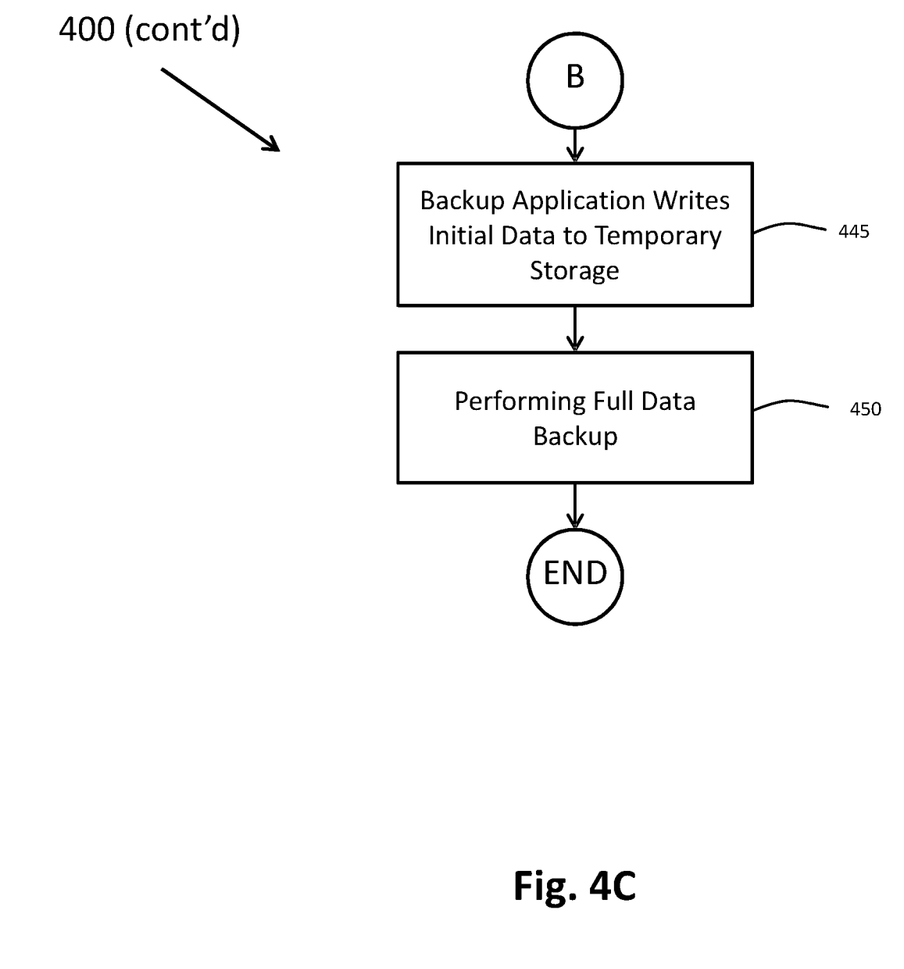

FIG. 4A through 4C illustrates a flowchart for a method 400 for performing a full data backup of user data according to an exemplary aspect. As described above, the backup application 107 can be a software application executed on a computer processor or the like that is configured to manage and control the algorithm described herein for creating a backup copy or copies of user data 101. According to the exemplary method, a snapshot of the user data 101 is first created at step 405. According to the exemplary aspect, the snapshot is a virtual copy of a disk volume (i.e., the user data 101). Although the snapshot appears to be another disk volume, the snapshot actually provides the state of the disk volume at the particular point in time that the snapshot is taking. It should be understood that once the snapshot has been taken and saved to snapshot storage 105, the system that stores the user data 101 (e.g., the computer, server and/or memory) can continue to operate in its normal manner. Once the snapshot is taken of user data 101 and stored in snapshot storage 105, the backup application 107 can initiate the backup process of the user data 101 (step 410). The backup process involves the backup application 107 causing the user data 101 to be transferred and/or copied to the cloud storage 102. As noted above, the data transfer can be performed from the storage device of user data 101 to the cloud storage 102 over a network, such as the Internet for example.

Concurrently, with the initiation of the backup process, the file tracker 104 is launched at step 415 to monitor any changes to user data 101, which can include modifications, deletions, and the like. According to one exemplary aspect, the file tracker 104 can be a module that is part of the backup application 107 as noted above. According to another aspect, the file tracker 104 can be implemented as a separate software module. For example, the system can implement the USN Journal that is an aspect of NTFS provided to maintain a record of changes made to user data 101. Furthermore, while the file tracker 104 is launched concurrently with the initiation of the backup process of user data 101, according to another exemplary aspect, the file tracker 104 is launched before this backup process is started. Importantly, the file tracker 104 should be executing when the backup process begins to ensure that all modifications, deletions, etc. to the data are tracked accordingly.

As further shown in FIG. 4A, the file tracker 104 continues to monitor the user data 101 as part of a loop while the data backup continues to be copied to cloud storage 102 as described above. Specifically, at step 420, the file tracker monitors the user data 101 stored in the associated storage device to determine whether any changes are made to the data. As shown in FIG. 4A, if there are no changes made to the data, the method repeats step 415 of tracking or monitoring the user data. In contrast, if a change of user data is detected, the method proceeds to FIG. 4B.

As shown, at step 425, if the file tracker 104 detects changes to user data 101, the data snapshot 103 saves the initial version of the file of the user data (i.e., before it was modified). In particular, the initial version of the file is that this volume snapshot reflects the state of the file before beginning the backup process. The file system is based (constructed) on this snapshot volume created at step 405. Thus, all files on this snapshot volume do not change despite the fact the files might change in the real volume during the backup process. The initial version of the file is the file that includes the full amount of data and metadata at the time before beginning the backup process.

Moreover, if, at step 440, the file tracker 104 determines any request to change or delete the user data (e.g., a write request by the user and/or computer), the file tracker 104 informs backup application 107 of this requested change. In turn, the snapshot saves the initial version of the modified file before it was modified. The file of the user data 101 can then be modified of which the file tracker traces and fixates the data changes to the file at step 430. Then, at step 435, the file tracker 104 can inform backup application 107 of the specific data of user data 101 that was modified. In turn, at step 440, the backup application 107 can access and read an initial or prior version of the file from the snapshot 103 on snapshot storage 105. That is, the backup application 107 can access initial (or prior) version of the snapshot of the file before it was modified from snapshot storage 105. Moreover, according to the exemplary aspect, the backup application 107 continues backup copying of the user data 101 to cloud storage 102, as initiated at step 405, until the backup is complete by copying the original user data 101 using the state of the data based on the initial snapshot generated at step 405. In parallel, the backup application, using the information generated by the file tracker 104 about modified data, can copy initial and modified data to local temporary storage 106 and then from such temporary storage 106 to the data cloud 102. Moreover, it should be appreciated that if the file tracker 104 indicates that the initial snapshot has not changed, the file tracker 104 is indicating that the original data and corresponding initial snapshot volume are the same.

As shown in FIG. 4C, the backup application 107 can cause the prior version of the file to be stored in temporary storage 106 at step 445. Then, as shown at step 450, the backup application can continue the backup process of user data 101 to cloud storage 102. Specifically, the backup application 107 continues backup copying of user data 101 to cloud storage 102 until the backup is complete by copying unmodified data from the original source 101 and modified data from temporary storage 106, which contains the initial version transferred from data snapshot 103 at step 450. Moreover, according to the exemplary aspect, after the initial state of the file is stored as a snapshot volume in temporary storage 106, the file tracker 104 is configured to continue to monitor changes in the user data 101 until the backup process is complete. Thus, in addition to the old (i.e., initial) version of the snapshot, the system and method is configured to save new/additional states of the data by creating a second and subsequent snapshots. Thus, it is possible to copy additional changed copies of the modified files from the temporary local storage 106 to cloud server 102. Advantageously, it should be appreciated that even corruption of the snapshot 103 does not affect the security of the user data 101 during the time of doing the backup process because changed protected data was backed up with initial state to local temporary 106 or cloud storage 102, and, therefore, it is possible to recover such data.

It should be appreciated that the above described method as illustrated in FIGS. 4A through 4C describe a single instance of a request to modify a file of user data 101. However, according to the exemplary aspect, the file tracker 104 is configured to track one or more requests to modify, delete, etc., files of user data 101. According to another exemplary aspect, each time a request for data modification is made, the backup application 107 can save any intermediate versions of the modified file because snapshot 103 only contains the initial state of the file as created at step 405.

Figure 5:
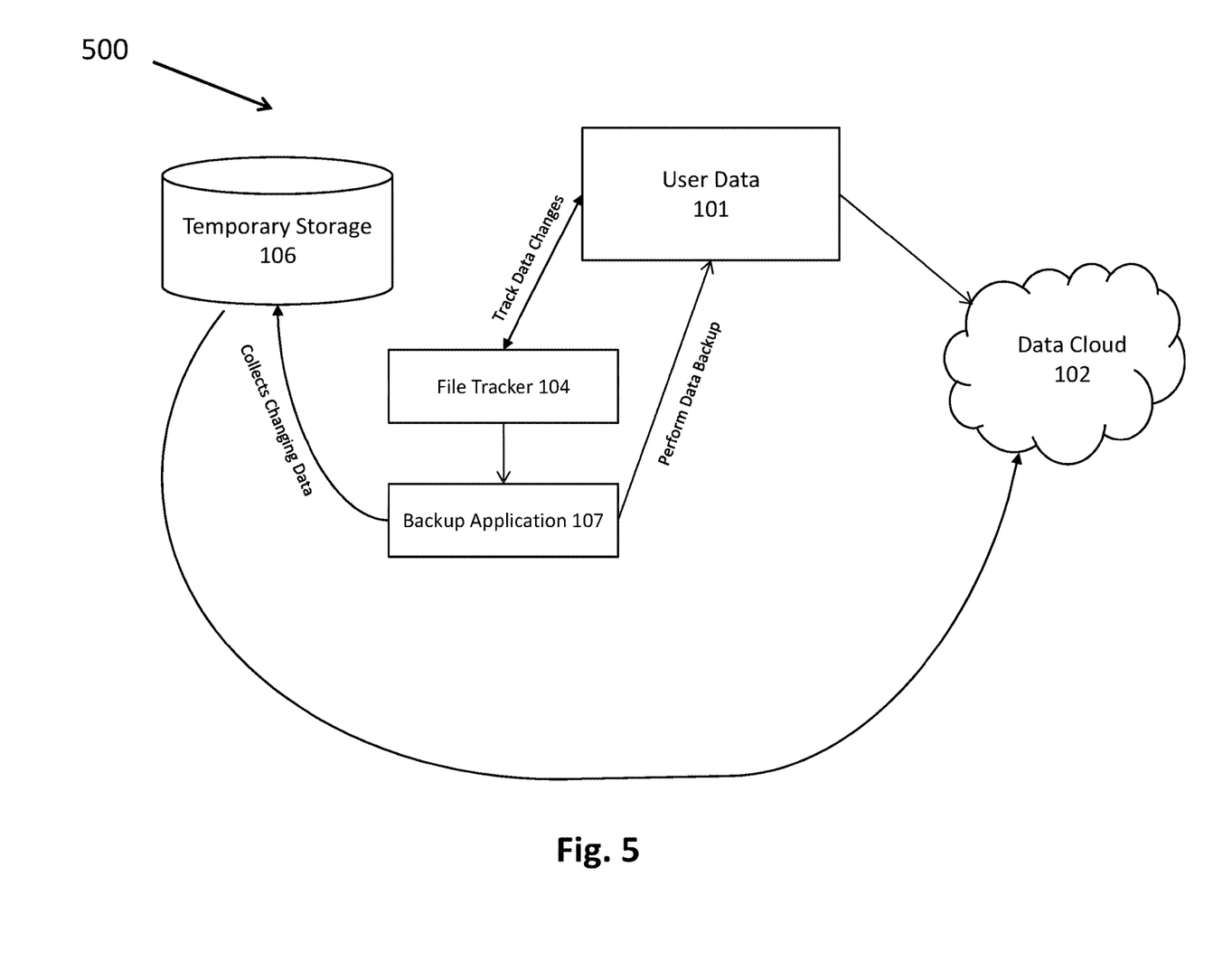
FIG. 5 is a block diagram illustrating a system for performing a full data backup of user data according to another exemplary aspect.

FIG. 5 is a block diagram illustrating a system for performing a full data backup of user data according to another exemplary aspect. As shown, the system 500 illustrated in FIG. 5 includes many of the same components as described above with respect to the system 200 illustrated in FIG. 2. In particular, system 500 includes user data 101 stored on any type of electronic storage device, such has a hard disk, that is capable of reading and writing of data. In addition, the data backup system 100 includes temporary storage 106 configured to store modified or changed data from user data 101. As further shown, the data backup system 200 also includes one or a plurality of software applications configured to create and manage the data backup process. Specifically, the data backup system 200 includes backup application 107 that is provided to control all actions for creating the data backup of user data 101 and the file tracker application 104 that is a software process or application configured to monitor any request to change, delete or otherwise manipulate the initial data of user data 101. Furthermore, data cloud 102 (i.e., cloud storage) is provided as part of data backup system 100 to store the actual backup copies of the user data 101.

According to the exemplary aspect, the primary difference between the system 500 shown in FIG. 5 and that of system 200 shown in FIG. 2 is that system 500 is configured to generate a backup of user data 101 without first generating a snapshot of the user data 101. Namely, once the backup application 107 initiates the data backup of user data 101 by controlling the transferring of such data to data cloud 102, the file tracker 104 begins tracking any modifications, deletions, etc. of user data 101. Furthermore, the file tracker 104 informs the backup application 107 of these changes, which in turn can store modified data in temporary storage 106. Thus, while the backup application 107 continues the data backup process by transferring user data 101 to cloud storage 102, the backup application can also store modified data in temporary storage and subsequently have this data also transferred to cloud storage 102.

Figure 6:
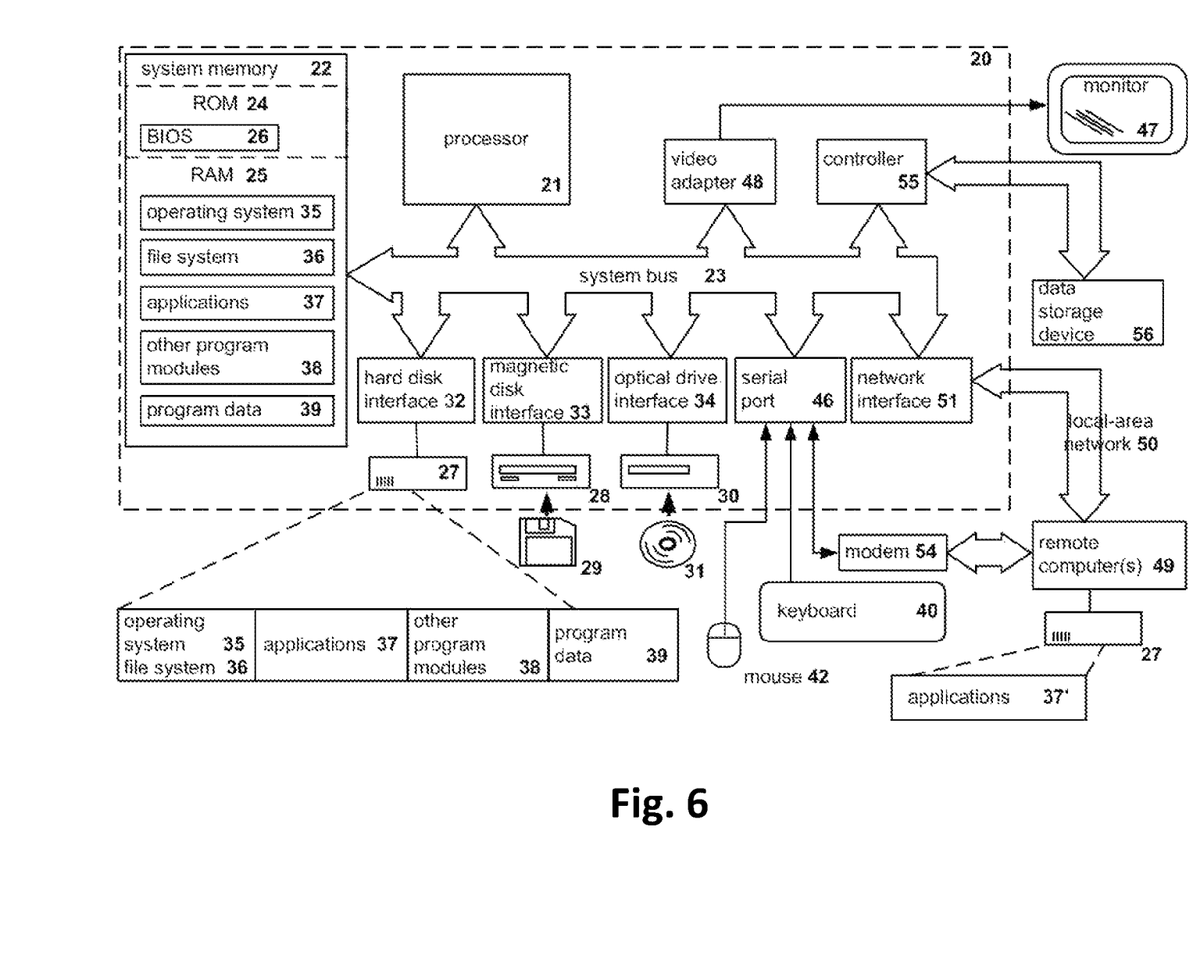
FIG. 6 illustrates an example of a general-purpose computer system on which the disclosed systems and method can be implemented.

FIG. 6 illustrates an example of a general-purpose computer system (which may be a personal computer or a server) on which the disclosed systems and method can be implemented according to an example aspect. It should be appreciated that the detailed general-purpose computer system can correspond to the computer 300 provide to implement the backup application 107 and/or file tracker 104 described above with respect to FIG. 3.

As shown in FIG. 6, the computer system 20 includes a central processing unit 21, a system memory 22 and a system bus 23 connecting the various system components, including the memory associated with the central processing unit 21. The central processing unit 21 can correspond to the CPU 214 and the system memory 22 can correspond to memory 216 of FIG. 3, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a backup of electronic data, the method comprising:
   generating, by a processor, a snapshot of the electronic data stored in at least one electronic memory;
   transmitting the snapshot to a snapshot storage device;
   initiating, by a processor, a transfer of the electronic data stored in the at least one electronic memory to a data storage facility;
   during the transfer, detecting, by the processor, at least one request to modify a file of the electronic data;
   saving, in a temporary storage device different from the electronic memory, the snapshot storage device, and the data storage facility, a modified file comprising:
      (1) an initial version of the file comprised in the snapshot stored on the snapshot storage device and
      (2) data modified in the file by the at least one request,
   such that the modified file is transferable to the data storage facility despite potential data loss in the snapshot and the electronic data;
   transferring, by the processor, the modified file from the temporary storage device to the data storage facility; and
   transferring, by the processor, unmodified files in the electronic data from the electronic memory to the data storage facility.

2. The method according to claim 1, wherein the saving of the initial version of the file comprises reading the initial version from the snapshot of the electronic data and saving the initial version of the file in the temporary storage device.

3. The method according to claim 1, wherein the transfer of the electronic data to the data storage facility comprises storing the electronic data as backup data in a cloud storage service.

4. The method according to claim 1, further comprising continuously monitoring, by the processor, the electronic data stored in the at least one electronic memory to detect any additional requests to modify additional files of the electronic data while the electronic data is transferred to the data storage facility.

5. The method according to claim 4, further comprising:
   detecting, by the processor, at least one additional request to modify another file of the electronic data;
   tracking, by the processor, an intermediate version of the another file; and
   saving the intermediate version of the another file in the at least one electronic memory.

6. A system for generating a backup of electronic data, the system comprising:
   a remote data storage facility;
   at least one local electronic memory configured to store electronic data; and
   a processor communicatively coupled to the at least one local electronic memory and configured to:
      generate a snapshot of the electronic data stored in the at least one electronic memory,
      transmit the snapshot to a snapshot storage device,
      initiate a transfer of the electronic data stored in the at least one electronic memory to the remote a data storage facility,
      during the transfer, detect at least one request to modify a file of the electronic data;
      save, in temporary storage device different from the electronic memory, the snapshot storage device, and the data storage facility, a modified file comprising:
         (1) an initial version of the file comprised in the snapshot stored on the snapshot storage device and
         (2) data modified in the file by the at least one request,
      such that the modified file is transferable to the data storage facility despite potential data loss in the snapshot and the electronic data;
      transfer the modified file from the temporary storage device to the data storage facility; and
      transfer unmodified files in the electronic data from the electronic memory to the data storage facility.

7. The system according to claim 6, wherein the processor is further configured to save the initial version of the file by reading the initial version from the snapshot of the electronic data and saving the initial version of the file in the temporary storage device.

8. The system according to claim 6, wherein the processor is further configured to transfer the electronic data to the data storage facility by storing the electronic data as backup data in a cloud storage service.

9. The system according to claim 6, wherein the processor is further configured to continuously monitor the electronic data stored in the at least one electronic memory to detect any additional requests to modify additional files of the electronic data while the electronic data is transferred to the data storage facility.

10. The system according to claim 9, wherein the processor is further configured to:
    detect at least one additional request to modify another file of the electronic data,
    track an intermediate version of the another file, and
    save the intermediate version of the another file in the at least one electronic memory.

11. A non-transitory computer readable medium storing computer executable instructions for generating a backup of electronic data, including instructions for:
    generating a snapshot of the electronic data stored in at least one electronic memory;
    transmitting the snapshot to a snapshot storage device;

initiating a transfer of the electronic data stored in the at least one electronic memory to a data storage facility;

during the transfer, detecting at least one request to modify a file of the electronic data;

saving, in a temporary storage device different from the electronic memory, the snapshot storage device, and the data storage facility, a modified file comprising:
(1) an initial version of the file comprised in the snapshot stored on the snapshot storage device and
(2) data modified in the file by the at least one request, such that the modified file is transferable to the data storage facility despite potential data loss in the snapshot and the electronic data;

transferring the modified file from the temporary storage device to the data storage facility; and transferring unmodified files in the electronic data from the electronic memory to the data storage facility.

12. A non-transitory computer readable medium according to claim 11, further including instructions for saving the initial version of the file by reading the initial version from the snapshot of the electronic data and saving the initial version of the file in the temporary storage device.

13. A non-transitory computer readable medium according to claim 11, wherein the transfer of the electronic data to the data storage facility comprises storing the electronic data as backup data in a cloud storage service.

14. A non-transitory computer readable medium according to claim 11, further including instructions for continuously monitoring the electronic data stored in the at least one electronic memory to detect any additional requests to modify additional files of the electronic data while the electronic data is transferred to the data storage facility.

15. A non-transitory computer readable medium according to claim 11, further including instructions for:

detecting at least one additional request to modify another file of the electronic data;

tracking an intermediate version of the another file; and saving the intermediate version of the another file in the at least one electronic memory.

16. The method according to claim 1, wherein the at least one request to modify the file of the electronic data includes at least one of a request to: change, delete and manipulate the file of the electronic data.

17. The method according to claim 1, wherein the detection of the at least one request to modify the file of the electronic data is performed by launching a monitoring of requests concurrently with the initiation of the transfer of the electronic data stored in the at least one electronic memory to the data storage facility.

18. The system according to claim 6, wherein the at least one request to modify the file of the electronic data includes at least one of a request to: change, delete and manipulate the file of the electronic data.

19. The system according to claim 6, wherein the process being configured to detect the at least one request to modify the file of the electronic data comprises the process being configured to launch a monitoring of requests concurrently with the initiation of the transfer of the electronic data stored in the at least one electronic memory to the data storage facility.

20. The non-transitory computer readable medium according to claim 11, wherein the at least one request to modify the file of the electronic data includes at least one of a request to: change, delete and manipulate the file of the electronic data, and the instruction for detection of the at least one request to modify the file of the electronic data includes instructions for: launching a monitoring of requests concurrently with the initiation of the transfer of the electronic data stored in the at least one electronic memory to the data storage facility.

* * * * *